(12) United States Patent
Wu et al.

(10) Patent No.: US 11,142,650 B2
(45) Date of Patent: Oct. 12, 2021

(54) AIR FLOW GENERATING DEVICE, GRAPHENE DISPERSION, AND PREPARATION METHOD THEREOF

(71) Applicant: Taiwan Textile Research Institute, New Taipei (TW)

(72) Inventors: Ting-Yu Wu, New Taipei (TW); Ting-Yu Chang, New Taipei (TW); Hsin-Chun Li, New Taipei (TW); Bo-Fan Lin, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 420 days.

(21) Appl. No.: 15/705,274

(22) Filed: Sep. 15, 2017

(65) Prior Publication Data

US 2018/0134902 A1    May 17, 2018

(30) Foreign Application Priority Data

Nov. 16, 2016 (TW) ................................. 105137512

(51) Int. Cl.
   *C09D 1/00* (2006.01)
   *B01J 19/18* (2006.01)
   (Continued)

(52) U.S. Cl.
   CPC ............ *C09D 1/00* (2013.01); *B01J 19/1806* (2013.01); *C01B 32/19* (2017.08); *C01B 32/194* (2017.08);
   (Continued)

(58) Field of Classification Search
   CPC .. F04D 5/001; C09D 1/00; C09D 7/20; C01B 32/19; C01B 32/194; C01B 2204/28; B01J 19/1806
   See application file for complete search history.

(56) References Cited

U.S. PATENT DOCUMENTS 2,542,476 A * 2/1951 Carlson .................. B65G 33/24
                                                            406/58
5,632,597 A * 5/1997 Hiroki .................... F04D 19/044
                                                            415/73
(Continued)

FOREIGN PATENT DOCUMENTS

CN       102431999       5/2012
CN       103253656       8/2013
(Continued)

OTHER PUBLICATIONS

"Office Action of Taiwan Counterpart Application", dated May 21, 2018, p. 1-p. 3.

*Primary Examiner* — Richard A Edgar
*Assistant Examiner* — Aye S Htay
(74) *Attorney, Agent, or Firm* — JCIPRNET

(57) ABSTRACT

An air flow generating device, a graphene dispersion, and a preparation method thereof are provided. The graphene dispersion is formed by a graphene powder and a processing solvent, wherein the graphene in the graphene dispersion has an average diameter of 0.5 μm to 1 μm, 3 to 5 layers, a solid content of 5% to 50%, and a residue oxygen content less than 1 wt %, and after being left to stand for 12 hours, the graphene dispersion has a distribution concentration increasing from the top section to the bottom section of the storage container, a viscosity of 5000 cps to 8000 cps, and a graphene concentration of 20 wt %.

12 Claims, 4 Drawing Sheets

(51) Int. Cl.
    *C01B 32/194*     (2017.01)
    *C01B 32/19*     (2017.01)
    *C09D 7/20*     (2018.01)
    *C01B 32/22*     (2017.01)
    *C01B 32/225*     (2017.01)

(52) U.S. Cl.
    CPC ............ *C01B 32/22* (2017.08); *C01B 32/225* (2017.08); *C09D 7/20* (2018.01); *C01B 2204/04* (2013.01); *C01B 2204/28* (2013.01); *C01P 2004/61* (2013.01); *C01P 2004/62* (2013.01); *C01P 2006/22* (2013.01)

(56) References Cited

U.S. PATENT DOCUMENTS

| | | | |
|---|---|---|---|
| 9,382,800 B2 * | 7/2016 | Simpson | .................... F04D 3/02 |
| 2014/0308112 A1 * | 10/2014 | Ledig | .................... F04D 29/126 |
| | | | 415/90 |
| 2015/0108401 A1 | 4/2015 | Hirai et al. | |

FOREIGN PATENT DOCUMENTS

| | | |
|---|---|---|
| CN | 103407998 | 11/2013 |
| CN | 104555995 | 4/2015 |
| CN | 104556006 | 4/2015 |
| CN | 105363535 | 3/2016 |
| TW | 201441147 | 11/2014 |
| TW | 201619050 | 6/2016 |

\* cited by examiner

AIR FLOW GENERATING DEVICE, GRAPHENE DISPERSION, AND PREPARATION METHOD THEREOF

CROSS-REFERENCE TO RELATED APPLICATION

This application claims the priority benefit of Taiwan application serial no. 105137512, filed on Nov. 16, 2016. The entirety of the above-mentioned patent application is hereby incorporated by reference herein and made a part of this specification.

BACKGROUND OF THE INVENTION

Field of the Invention

The invention relates to an air flow generating device, a graphene dispersion, and a preparation method thereof, and more particularly, to an air flow generating device for preparing a graphene powder with low oxygen content, a graphene dispersion, and a preparation method thereof.

Description of Related Art

Graphene has a two-dimensional structure formed by carbon atoms bonded with $sp^2$ covalent bonds, and has special properties such as a relatively high carrier mobility, hardness, thermal conductivity, and large surface area. Therefore, in recent years, graphene has become a highly-valued research target in fields such as medicine, electronics, and optoelectronic components. At the same time, the graphene dispersion, which is composed of graphene and a specific solvent, can be extensively applied in the coating field, and is an important additive in products such as conductive coatings and auxiliaries thereof, lithium ion electrode auxiliaries, anti-corrosion coating additives, and graphene heat spread films.

However, the known graphene dispersion preparation technique has disadvantages for commercialization such as waste water pollution and toxic waste exhaust issues in chemical modification process, cost issues related to lower carbon yield for physical method, for example, mechanical peeling, ultrasonic oscillation, and ball milling method. These above disadvantages will strongly increase the cost and difficulty of production management. Moreover, current commercial products of graphene dispersion mostly have low solid content (usually lower than 1%), wherein excess solvent significantly causes subsequent resin properties and the following processability problems for less controlling rheology or viscosity, and therefore these commercial products are not suitable for application in the coating field. Moreover, although surface modification and excess dispersing agent (greater than 5%) could enhance the dispersion of graphene, both may destroy intrinsic properties of graphene coating by structure damage and interconnection of blockage of graphene, which are respectively generated along with chemical treatment and caused by coverage of dispersion agent.

Based on the above, development of a graphene dispersion that can meet both of environmental protection and commercialization needs with high solid content, high production yield, variation option of solvent, controllable rheology of suspension, long stable duration of suspension, reliable quality of products, and low manufacturing cost is still a crucial problem for graphene industry.

SUMMARY OF THE INVENTION

The invention provides an air flow generating device for preparing a graphene powder with low oxygen content, a graphene dispersion, and a preparation method thereof. The graphene powder fabricated by the air flow generating device is used to prepare the graphene dispersion for surmounting most of obstacles of current technical barriers in the present graphene dispersion process effectively. As a result, a high-concentration graphene dispersion having a specific concentration variation can be prepared to not only meet environmental needs, but also have significantly high solid content, good production yield, excellent suspension, and homogenize product specifications, and to significantly reduce the manufacturing cost of the graphene dispersion.

The air flow generating device of the invention includes an outer bushing and a rotating awl. The outer bushing has a chamber, an intake opening, and an outtake opening, wherein the intake opening is connected to the chamber from below and the outtake opening is connected to the chamber from above, and the chamber has a necked portion. The rotating awl is disposed in the chamber, wherein the rotating awl and the chamber are conformal, the rotating awl and the inner wall of the chamber have a slit spacing in between, the rotating awl includes a rotating body and a plurality of screw threads, and the screw threads are distributed on the outer surface of the rotating body from the bottom of the rotating body toward the top of the rotating body in a spiral manner. When the rotating awl rotates in the chamber, an upward cyclone having a horizontal component is produced via the screw threads and the slit spacing.

In an embodiment of the invention, the top surface of the rotating awl and the top surface of the necked portion are level.

In an embodiment of the invention, the rotating body includes a bottom, a top, and a center located between the bottom and the top, wherein the diameter of the rotating body is decreased from the bottom to the top. Moreover, the diameter of the bottom surface of the bottom is greater than the diameter of the top surface of the bottom. Moreover, the diameter of the bottom surface of the center is greater than the diameter of the top surface of the center, and the diameter of the bottom surface of the center is greater than the diameter of the top surface of the bottom. Moreover, the diameter of the bottom surface of the top is greater than the diameter of the top surface of the top, and the diameter of the bottom surface of the top is equal to the diameter of the top surface of the center.

In an embodiment of the invention, the cross section of the rotating awl is stellate.

In an embodiment of the invention, the rotating speed of the rotating awl is between 3000 rpm (revolution(s) per minute) and 7000 rpm.

In an embodiment of the invention, the quantity of the screw threads is between 8 and 32; and in another embodiment, the quantity of the screw threads is between 12 and 18.

In an embodiment of the invention, the slit spacing is between 0.05 mm and 10 mm; and in another embodiment, the slit spacing is between 0.1 mm and 1 mm.

The preparation method of the graphene dispersion of the invention includes the following steps. A homogenization process is performed on a graphene powder and a processing solvent to form a graphene paste. Next, a layer-thinning process is performed on the graphene paste to form a graphene dispersion, wherein the graphene powder is formed using the air flow generating device.

In an embodiment of the invention, the preparation method of the graphene powder includes the following steps. A continuous high-speed reciprocating rolling process is performed on a graphite raw material to form a graphite precursor, wherein the graphite precursor has a dislocation structure. Next, the graphite precursor is subjected to an intercalation reaction via horizontal compressed air flow to form a graphene-gas intercalation compound. Next, the graphene-gas intercalation compound is subjected to a swelling/exfoliation process via intercalation air pressure release to form a graphene aggregate. Next, the graphene aggregate is suspended, drifted, and collided with one another in the air flow to produce the graphene powder.

In an embodiment of the invention, the intercalation spacing in the graphite precursor is 3.44 Å to 3.60 Å.

In an embodiment of the invention, the wind velocity of the horizontal compressed air flow is Mach 0.3 to Mach 1.

In an embodiment of the invention, the air volume of the horizontal compressed air flow is 186 CMM to 619 CMM.

The graphene dispersion of the invention is formed by a graphene powder and a processing solvent using the preparation method of the graphene dispersion, wherein the graphene in the graphene dispersion has an average diameter of 0.5 μm to 1 μm, 3 to 5 layers, a solid content of 5% to 50%, and a residue oxygen content less than 1 wt %. The graphene dispersion of the invention has the nature of constant viscosity of 5000 cps to 8000 cps, a graphene concentration of 20 wt %, and after being left to stand for 12 hours, a concentration distribution of the graphene dispersion increases from the top section to the bottom section in a storage container.

In an embodiment of the invention, the concentration difference between the top section and the bottom section in the graphene dispersion is 0.1 wt % to 20 wt %.

In an embodiment of the invention, the graphene powder has 5 to 10 layers.

In an embodiment of the invention, the graphene powder has an average diameter of 3 μm to 15 μm.

In an embodiment of the invention, the graphene powder has a residue oxygen content less than 0.1 wt %.

In an embodiment of the invention, the processing solvent includes a hydrocarbon solvent, a halogenated hydrocarbon solvent, an alcohol solvent, a phenol solvent, a ketone solvent, an ester solvent, an ether solvent, an acetal solvent, an acid solvent, an acid anhydride solvent, a nitrogen-containing compound solvent, a sulfur-containing compound solvent, a polyfunctional group solvent, or an inorganic solvent.

In an embodiment of the invention, the processing solvent has an interfacial tension of 15 mN/m to 50 mN/m and a Hansen solubility parameter of 5.0 $MPa^{0.5}$ to 15 $MPa^{0.5}$.

In an embodiment of the invention, based on the total weight of the graphene dispersion, the amount of the graphene powder is 0.001 wt % to 30 wt %.

In an embodiment of the invention, the processing solvent has a polar force parameter of 0.5 $MPa^{0.5}$ to 5.5 $MPa^{0.5}$, a dispersing power parameter of 7.0 $MPa^{0.5}$ to 9.0 $MPa^{0.5}$, and a hydrogen bond force parameter of 2.0 $MPa^{0.5}$ to 7.0 $MPa^{0.5}$.

Based on the above, the air flow generating device of the invention leads to a transformation from graphite raw materials to a graphene powder with low oxygen content using a direct continuous physical method, and the graphene powder has specific features of a narrow distribution of layer number for the uniformity, a uniformed diameter distribution for the following dispersion process with a low energy, and well-crystalized structure for the good compatibility with the specific solvent. At the same time, the invention provides a high solid content graphene dispersion utilized the graphene powder. The graphene dispersion has advantages such as high yield for the uniformity of products and also for the benefit of cost, high and adjustable solid content for easy handling in the following process, and therefore the issues of low solid content and small solvent selection of graphene dispersion commercial products can be solved, such that processability and the adaptability to different coating processes can be improved to facilitate application in the coating field.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The invention provides an air flow generating device for preparing a graphene powder, a graphene dispersion, and a preparation method thereof, wherein the graphene powder prepared by the air flow generating device is used to prepare the graphene dispersion. In the following, the details of the air flow generating device, the graphene dispersion, and the preparation method thereof of the invention are described.

<Air Flow Generating Device>

Figure 1:
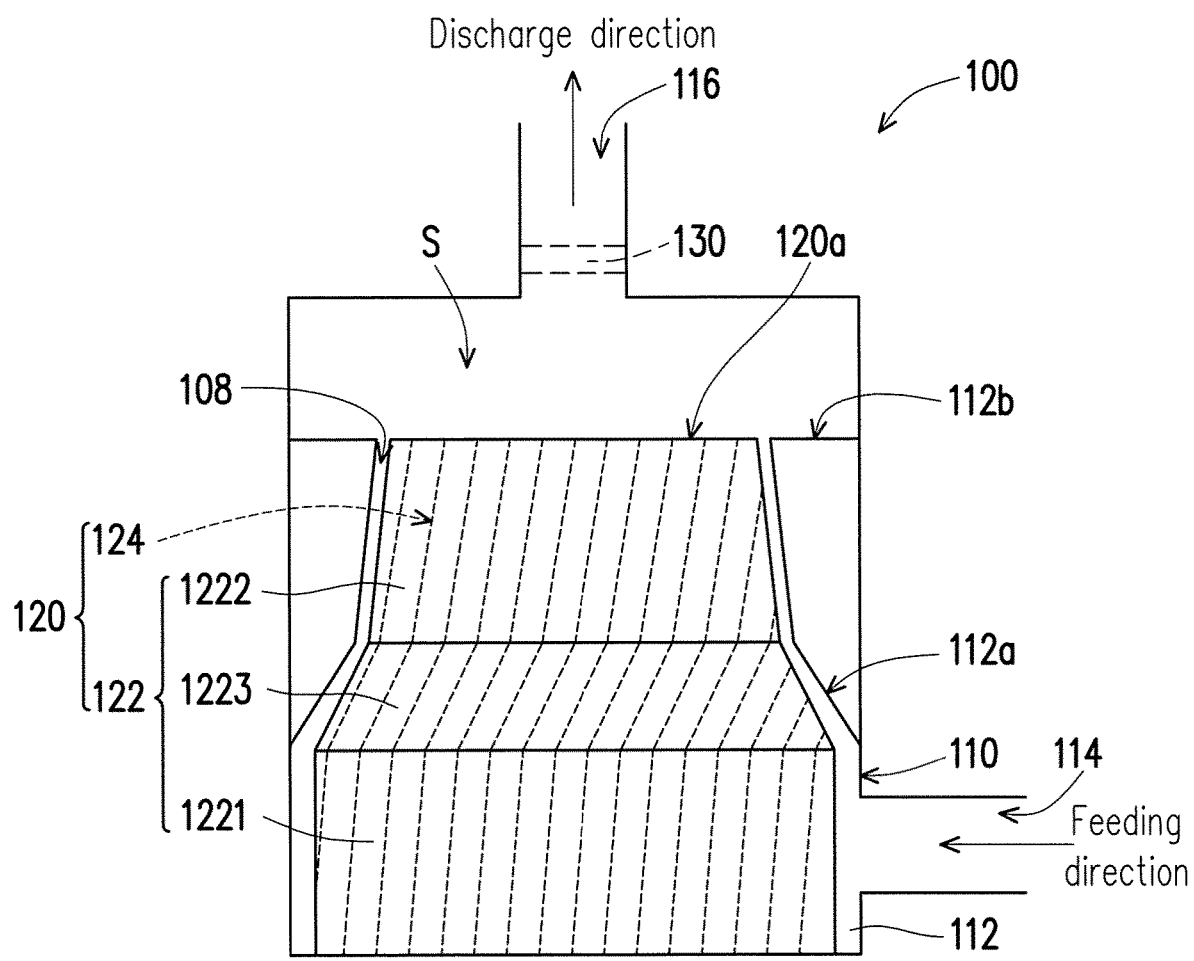
FIG. 1 is the cross section of an air flow generating device.
Figure 2:
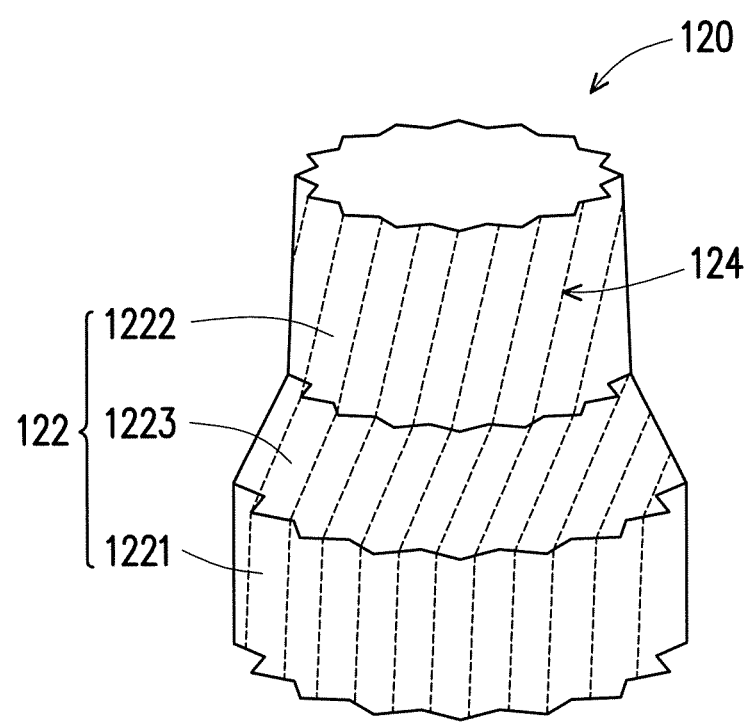
FIG. 2 is a perspective view of the rotating awl of FIG. 1.

FIG. 1 is the cross section of an air flow generating device, and FIG. 2 is a perspective view of the rotating awl of FIG. 1. Referring to both FIG. 1 and FIG. 2, an air flow generating device 100 includes an outer bushing 110 and a rotating awl 120, wherein the outer bushing 110 has a chamber 112, an intake opening 114, and an outtake opening 116. The intake opening 114 is connected to the chamber 112 from below and the outtake opening 116 is connected to the chamber 112 from above, and the chamber 112 has a necked portion 112a. The rotating awl 120 and the chamber 112 are conformally disposed in the chamber 112, and the rotating awl 120 and the inner wall of the chamber 112 have a slit spacing 108 in between, wherein the rotating awl 120 includes a rotating body 122 and a plurality of screw threads 124, and the screw threads 124 are distributed on the outer surface of the rotating body 122 from a bottom 1221 of the rotating body 122 toward the top of the rotating body 122 in a spiral manner.

In an embodiment, the quantity of the screw threads 124 can be between 8 and 32, and the quantity of the screw threads 124 in another embodiment can be between 12 and 18. The quantity of the screw threads 124 is not limited by the description herein, and the designer can change the quantity of the screw threads 124 out of consideration of other factors based on actual need. Moreover, a top surface 120a of the rotating awl 120 and a top surface 112b of the necked portion 112a are level.

Figure 3C:
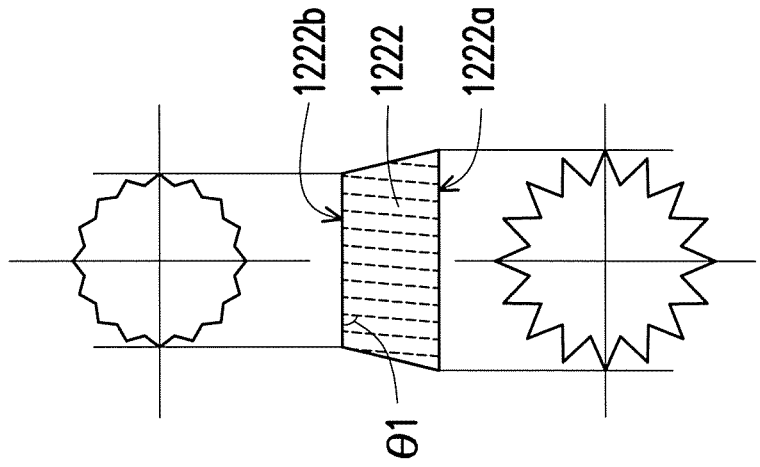
FIG. 3C is a schematic diagram of the top surface and bottom surface of the bottom of the rotating awl.
Figure 3B:
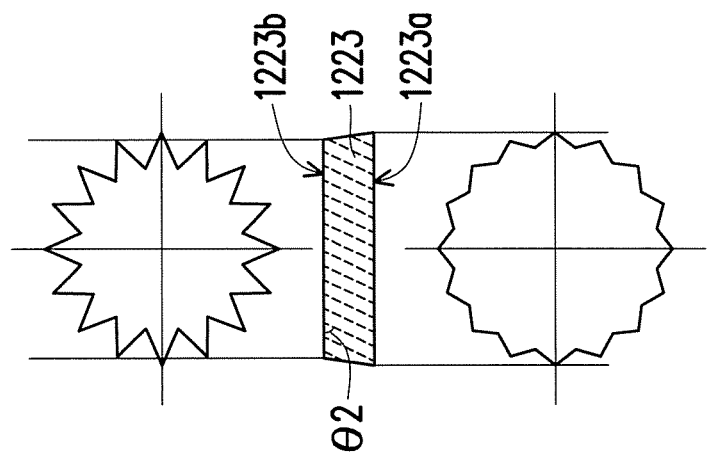
FIG. 3B is a schematic diagram of the top surface and bottom surface of the center of the rotating awl.
Figure 3A:
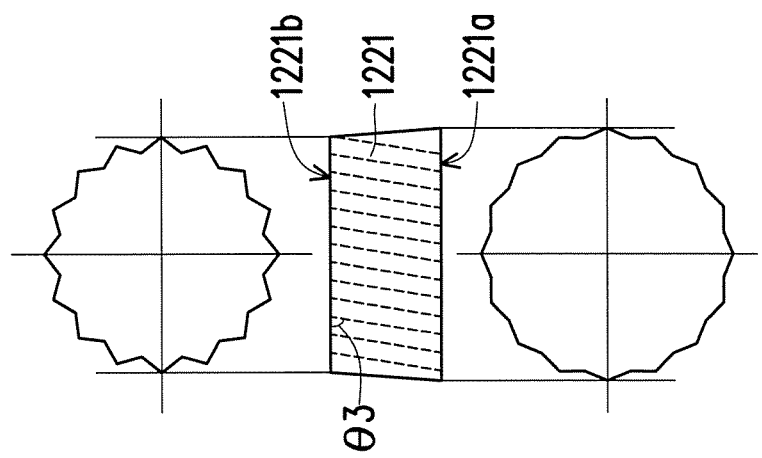
FIG. 3A is a schematic diagram of the top surface and bottom surface of the top of a rotating awl.

FIG. 3A is a schematic diagram of the top surface and bottom surface of the top of a rotating awl, FIG. 3B is a schematic diagram of the top surface and bottom surface of the center of the rotating awl, and FIG. 3C is a schematic diagram of the top surface and bottom surface of the bottom of the rotating awl. Referring to all of FIG. 3A, FIG. 3B, and FIG. 3C, the rotating body 122 can be divided into a bottom 1221, a top 1222, and a center 1223 located between the bottom 1221 and the top 1222, and since the screw threads 124 are formed on the outer surface (not shown) of the rotating body 122, cross sections of the rotating awl 120 are taken along the circumferential direction of the rotating awl 120, and the cross sections of the rotating awl 120 are substantially stellate. The depth and width of the screw threads 124 can be designed based on actual need.

Based on the above, the diameter of the rotating body 122 is decreased from the bottom 1221 to the top 1222. More specifically, the diameter of a bottom surface 1221a of the bottom 1221 of the rotating awl 120 is greater than the diameter of a top surface 1221b of the bottom 1221, the diameter of a bottom surface 1223a of the center 1223 is equal to the diameter of the top surface 1221b of the bottom 1221, and the diameter of the bottom surface 1223a of the center 1223 is greater than the diameter of a top surface 1223b of the center 1223, as shown in FIG. 3B and FIG. 3C. Moreover, the diameter of a bottom surface 1222a of the top 1222 is equal to the diameter of the top surface 1223b of the center 1223, and the diameter of the bottom surface 1222a of the top 1222 is greater than the diameter of a top surface 1222b of the top 1222, as shown in FIG. 3A and FIG. 3B. Due to the difference among the diameters of the bottom 1221, the center 1223, and the top 1222, the quantity of the screw threads 124 located in each portion is also different.

It should be mentioned that, the rotating body 122 can be integrally formed or formed by the assembly of three columns having different diameters. The screw threads 124 located at the top 1222 of the rotating body 122 can be disposed at the same intervals, and an angle θ1 relative to the top surface 1222b or the bottom surface 1222a of the top 1222 is fixed, and is, for instance, 15 degrees to 35 degrees; the screw threads 124 located at the center 1223 can also be disposed at the same intervals, and an angle θ2 relative to the top surface 1223b or the bottom surface 1223a of the center 1223 is fixed, and is, for instance, 35 degrees to 70 degrees; and the screw threads 124 located at the bottom 1221 can also be disposed at the same intervals, and an angle θ3 relative to the top surface 1221b or the bottom surface 1221a of the bottom 1221 is fixed, and is, for instance, 70 degrees to 90 degrees. However, the angles of the screw threads 124 at the top 1222, the center 1223, and the bottom 1221 are not exactly the same. For instance, the angle of the screw threads 124 located at the top 1222 is 25 degrees, the angle of the screw threads 124 located at the bottom 1221 is 60 degrees, and the angle of the screw threads 124 located at the center 1223 is about 42.5 degrees. Moreover, the angle of the screw threads 124 at the junctions of the top 1222, the center 1223, and the bottom 1221 can be adjusted in response to changes in diameter, and the angle can be 35 degrees to 85 degrees.

When the air flow generating device 100 of FIG. 1 is used, the rotating awl 120 rotates at a rotating speed of 3000 rpm to 7000 rpm in the chamber 112. In general, when the rotating awl 120 rotates in the chamber 112, if the outer surface of the rotating awl 120 and the surface of the inner wall of the chamber 112 are smooth, then gas entering from the intake opening 114 is driven by the rotation of the rotating awl 120 to produce a rotating air flow and is dissipated from the outtake opening 116 located at the top 1222 of the outer bushing 110. Via the centrifugal force produced by the rotation of the rotating awl 120, the rotating air flow produces some horizontal component, but compared to the force of the air flow escaping upward from the outtake opening 116, the horizontal component is not significant, and is almost negligible.

In particular, via the screw threads 124 formed on the outer surface of the rotating body 122 in a spiral distribution, when gas enters the chamber 112 from the intake opening 114 and is driven by the rotating awl 120 to form a rotating air flow, the centrifugal force guided by the screw threads 124 makes the horizontal component of the rotating air flow significant.

Moreover, although the rotating awl 120 and the outer bushing 110 are conformal, the slit spacing 108 between the rotating body 122 and the inner wall of the chamber 112 changes from the bottom surface 1221a of the bottom 1221 of the rotating body 122 to the top surface 1222b of the top 1222 of the rotating body 122, and is, for instance, decreased. Such design method is based on a gas flux equation to compress the gas entering the air flow generating device 100 when flowing upward such that air flow is accelerated from bottom to top. Since the chamber 112 provides one wide space S on the top surface of the top 1222 of the rotating body 122, the air flow entering the wide space S after leaving the rotating awl 120 is expanded, and is then dissipated from the outtake opening 116.

In short, the air flow introduced from the intake opening 114 experiences the flow rate changes of slow, fast, and slow from the bottom 1221 to the top 1222 of the rotating awl 120, wherein since the air flow is immediately released to a relatively larger space S after leaving the slit spacing 108 between the rotating awl 120 and the inner wall of the chamber 112, the volume of the gas is continuously and rapidly expanded.

The air flow generating device 100 allows the air flow to produce a horizontal component via the screw threads 124 and the slit spacing 108, and after the air flow leaves the screw threads 124, the air flow produces a continuous and rapid gas volume change in the unit space S, and therefore the production of graphene powder requiring an intercalation process can be facilitated.

<Graphene Powder>

Figure 4:
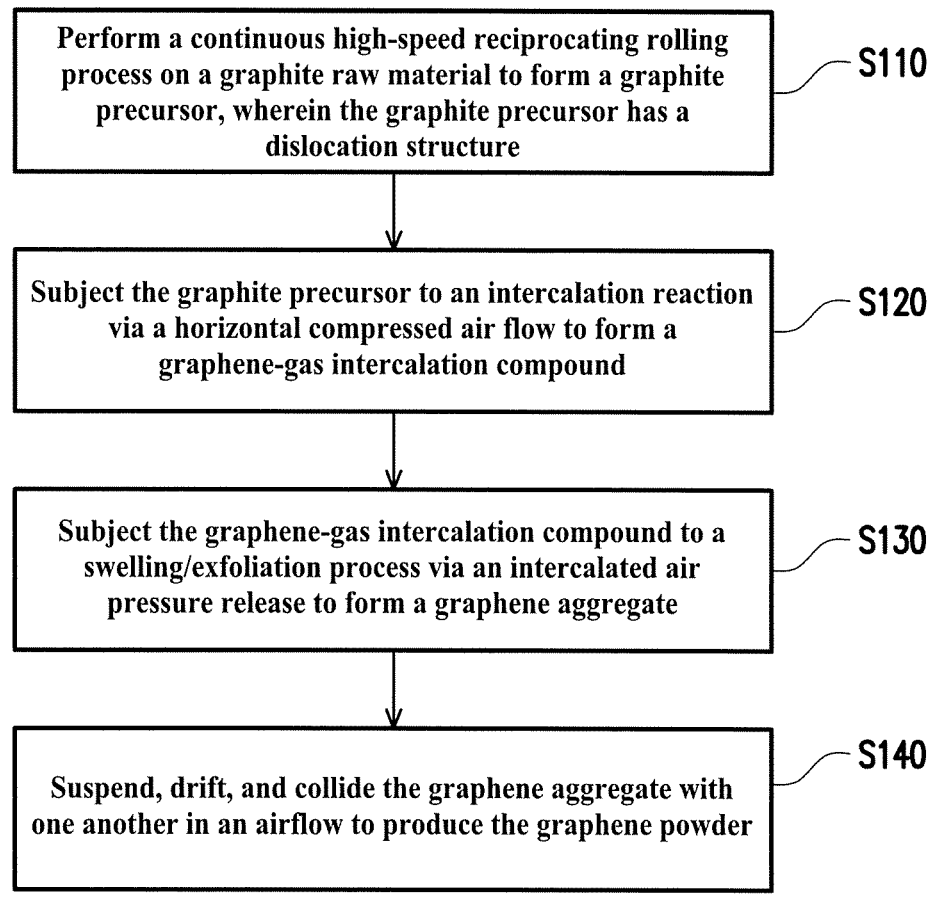
FIG. 4 is a flow schematic diagram of the manufacturing method of a graphene powder.

Via the air flow generating device, a graphene powder with low oxygen content can be manufactured. FIG. 4 is a flow schematic diagram of the manufacturing method of a graphene powder. In the following, the manufacturing method of a graphene powder floc of an embodiment of the invention is described with FIG. 4.

First, referring to FIG. 4, step S110 is performed to perform a continuous high-speed reciprocating rolling process on a graphite raw material to form a graphite precursor, wherein the graphite precursor has a dislocation slippage structure. In the present embodiment, the intercalation spacing in the graphite raw material is, for instance, 3.354 Å. The graphite precursor has an intercalation spacing of, for instance, 3.44 Å to 3.60 Å; an average particle size of, for instance, 10 μm to 100 μm, preferably, for instance, 15 μm to 35 μm; an average thickness of, for instance, 0.05 μm to 1 μm, preferably, for instance, 0.3 μm to 0.8 μm; and a residue oxygen content of, for instance, less than 5%, preferably, for instance, less than 1%. Since the graphite precursor has a dislocation slippage structure, an intercalation reaction can be facilitated in a subsequent process. More specifically, a graphite precursor plate having a dislocation slippage structure can be formed via the tangential stress on the plane of a continuous high-speed reciprocating rolling process, and then a graphite precursor powder is formed via a dry high-speed polishing process.

Next, referring further to FIG. 4, step S120 is performed to subject the graphite precursor to an intercalation reaction via horizontal compressed air flow to form a graphene-gas intercalation compound. In the present embodiment, the wind velocity of the horizontal compressed air flow is, for instance Mach 0.3 to Mach 1, preferably, for instance, Mach 0.5 to Mach 0.8; and the air volume is, for instance, 186 CMM to 619 CMM, preferably, for instance, 310 CMM to 495 CMM. More specifically, the horizontal compressed air flow can be a subcritical fluid, and since the wind velocity is, for instance, Mach 0.3 or above, the horizontal compressed air flow can also be referred to as subsonic compressible flow.

Next, referring further to FIG. 4, step S130 is performed to subject the graphene-gas intercalation compound to a swelling/exfoliation process via intercalation air pressure release to form a graphene aggregate. Next, as shown in FIG. 4, step S140 is performed to make the graphene aggregate suspend, drift, and collide with one another in the air flow, such that a graphene powder is produced.

In the present embodiment, the graphene powder has the advantages of fixed number of layers and consistent diameter feature. More specifically, the graphene powder has, for instance, 5 to 10 layers; the thickness is, for instance, 2.5 nm to 4.5 nm; the residue oxygen content is, for instance, less than 0.1 wt %; and the bulk density is, for instance, 0.001 g/cm$^3$ to 2.24 g/cm$^3$, preferably, for instance, 0.01 g/cm$^3$ to 0.5 g/cm$^3$. The average diameter of the graphene powder is, for instance, 3 µm to 15 µm, and more specifically, the average diameter is, for instance, 3 µm to 5 µm, 5 µm to 10 µm, or 10 µm to 15 µm, more preferably, for instance, 3 µm to 5µm.

<Graphene Dispersion>

The graphene dispersion of the invention is prepared with the graphene powder and a processing solvent, wherein based on the total weight of the graphene dispersion, the amount of the graphene powder is, for instance, 0.001 wt % to 30 wt %. Since the preparation of the graphene dispersion is performed using oligomeric graphene powder with low oxygen content having a specific number of layers and a specific form, the graphene powder has the feature of easy homogenization at low energy without structural damage caused by oxidation based on the characteristics of fixed number of layers and uniform diameter. As a result, the resulting graphene dispersion has advantages such as high yield, high solid content, and adjustable solid content.

More specifically, the preparation method of the graphene dispersion of the invention includes the following steps. First, a homogenization process is performed on the graphene powder and the processing solvent to prepare a graphene paste. Next, a layer-thinning process is performed on the graphene paste to prepare a homogeneous graphene dispersion. In the following, the details of the preparation method of the graphene dispersion of the invention are described.

Processing Solvent

In the present embodiment, the processing solvent can include a hydrocarbon solvent, a halogenated hydrocarbon solvent, an alcohol solvent, a phenol solvent, a ketone solvent, an ester solvent, an ether solvent, an acetal solvent, an acid solvent, an acid anhydride solvent, a nitrogen-containing compound solvent, a sulfur-containing compound solvent, a polyfunctional group solvent, or an inorganic solvent. More specifically, the processing solvent is, for instance, toluene, xylene (xyl), ethanol, isopropanol (IPA), butanol, acetone, ethyl acetate, butyl acetate (BAC), N,N-dimethylformamide (DMF), N-methylpyrrolidone (NMP), N,N-dimethylacetamide (DMAc), or water.

However, a suitable processing solvent for the invention is not limited to the examples provided in the above, and other solvents having the following properties can also be used as the processing solvent: an interfacial tension of, for instance, 15 mN/m to 50 mN/m, preferably, for instance, 20 mN/m to 40 mN/m; a Hansen solubility parameter of, for instance, 5.0 MPa$^{0.5}$ to 15 MPa$^{0.5}$; a polar force parameter of, for instance, 0.5 MPa$^{0.5}$ to 5.5 MPa$^{0.5}$; a dispersing power parameter of, for instance, 7.0 MPa$^{0.5}$ to 9.0 MPa$^{0.5}$; and a hydrogen bond force parameter of, for instance, 2.0 MPa$^{0.5}$ to 7.0 MPa$^{0.5}$. More specifically, based on the total weight of the graphene dispersion, the amount of the processing solvent is, for instance, 70 wt % to 99.99 wt %.

Homogenization Process

In the preparation method of the graphene dispersion of the invention, a homogenization process is performed to form a graphene paste used as a byproduct for an intermediate process. In the homogenization process, the average diameter of the graphene powder is adjusted and changed by producing normal direction stress to the graphene structure without changing the graphene thickness to achieve the object of homogenized diameter. As a result, the suspension of graphene in the liquid can be effectively extended, wherein the maximum dispersion duration can achieve 150 days or more, and also dispersant content can be limited.

In the present embodiment, two major processes of pre-mixing and severe dispersion in homogenization are utilized, and homogenization via equipment such as a DC mechanical mixer, planetary mixer, mixer, ball mill mixer, three roller mixer, single screw mixer, or double screw mixer, and therefore compared to a known process in which graphite is used as the raw material and graphene dispersion is obtained via dispersion, oxidation, peeling, and centrifugal processes, the invention can solve the issues of, for instance, low graphene content and reduced conductivity due to structural damage from oxidation present in prior art.

Graphene Paste

In the present embodiment, the features of the graphene paste contain: the graphene has an average diameter of, for instance, 0.1 µm to 1.5 µm, preferably, for instance, 0.3 µm to 0.8 µm; and the graphene has a thickness of, for instance, 2.5 nm to 4.5 nm, a residue oxygen content of, for instance, less than 0.5%, and a solid content of, for instance, 5% to 50%, most preferably, for instance, 15% to 30%.

Layer-Thinning Process

In the preparation method of the graphene dispersion of the invention, a layer-thinning process is performed on the graphene paste to form a homogeneous graphene dispersion. In the layer-thinning process, the average thickness of the graphene powder is changed by producing plane direction stress to the graphene structure without changing the graphene diameter to achieve the object of homogenized suspension. As a result, suspension time and allowable ratio of solid content can be increased.

In the present embodiment, the thin film process can contain two different processes, which are respectively a mixing process and a high-energy dispersing process. More specifically, the mixing process can be performed via, for instance, a five-axis mixing method, ball mill mixing method, or shear mixing method, and in the high-energy shear process, heavy dispersion can be performed via, for instance, high-speed homogenization or high-pressure crushing to form a homogeneous graphene dispersion.

Via the preparation method of the graphene dispersion of the invention, a high-concentration graphene dispersion having a specific concentration variation can be formed without the addition of any dispersant, and therefore the graphene structure in the graphene dispersion is not affected by excess dispersing aid, and good material properties are retained. More specifically, in the graphene dispersion of the invention, the purity of the graphene is about 100%, and the average diameter of the graphene in the graphene dispersion is, for instance, 0.5 μm to 1 μm; the number of layers is, for instance, 3 to 5; the solid content is, for instance, 5% to 50%; the residue oxygen content of graphene is, for instance, less than 1 wt %; and the thickness is, for instance, 0.8 nm to 4.5 nm, preferably, for instance, 1.0 nm to 2.0 nm.

Moreover, the concentration distribution of the graphene dispersion can be increasing from the top section to the bottom section of the storage container after being left to stand for 12 hours, the viscosity is, for instance, 5000 cps to 8000 cps, and the graphene concentration is, for instance, 20 wt %, wherein the concentration difference (C %) between the top section and the bottom section of the storage container is, for instance, 0.1 wt % to 20 wt %, preferably, for instance, 5 wt % to 15 wt %, and the maximum stable dispersion duration can achieve 150 days or more.

In the following, the graphene dispersion provided by the invention is described in detail via an experimental example. However, the following experimental example is not intended to limit the invention.

EXPERIMENTAL EXAMPLE

To prove that the graphene dispersion of the invention is with higher solid content and stable dispersion, this experimental example is provided below.

It should be mentioned that, since the preparation method of the graphene dispersion is described in detail above, in the following, details relating to the preparation of the graphene dispersion are omitted for ease of explaining.

Preparation of Graphene Dispersion

Based on the preparation method of the graphene dispersion of the invention, Table 1 provides each of the composition conditions and process conditions for the preparation of the graphene dispersions of example 1 to example 21. In Table 1, the mixing ratio (G/S) represents the ratio of graphene/solvent.

TABLE 1

| | Graphene powder | | | | Homogenization process | | | Layer-thinning process | | | |
| | | | | | Polishing | | | | | | |
| | Average diameter (μm) | Number of layers | Mixing ratio (G/S) | Solid content (phr) | Processing time (hr) | bead density (g/cm$^3$) | Processing solvent | Mixing ratio (G/S) | Solid content (phr) | Processing time (hr) | Dispersing solvent |
|---|---|---|---|---|---|---|---|---|---|---|---|
| Example 1 | 10 to 15 | 8 to 10 | 1/10 | 10 | 48 | 5.7 | NMP | 1/10 | 10 | 2 | NMP |
| Example 2 | 5 to 10 | 8 to 10 | 1/10 | 10 | 48 | 5.7 | NMP | 1/10 | 10 | 2 | NMP |
| Example 3 | 3 to 5 | 6 to 8 | 1/10 | 10 | 48 | 5.7 | NMP | 1/10 | 10 | 2 | NMP |
| Example 4 | 3 to 5 | 6 to 8 | 1/10 | 10 | 144 | 5.7 | NMP | 1/10 | 10 | 2 | NMP |
| Example 5 | 3 to 5 | 6 to 8 | 1/10 | 10 | 80 | 5.7 | NMP | 1/10 | 10 | 2 | NMP |
| Example 6 | 3 to 5 | 6 to 8 | 1/10 | 10 | 96 | 5.7 | NMP | 1/10 | 10 | 2 | NMP |
| Example 7 | 3 to 5 | 6 to 8 | 1/10 | 10 | 144 | 5.7 | NMP | 1/10 | 10 | 2 | NMP |
| Example 8 | 3 to 5 | 6 to 8 | 1/10 | 10 | 144 | 5.7 | NMP | 1/10 | 10 | 4 | NMP |
| Example 9 | 3 to 5 | 6 to 8 | 1/10 | 10 | 144 | 5.7 | NMP | 1/10 | 10 | 6 | NMP |
| Example 10 | 3 to 5 | 6 to 8 | 1/10 | 10 | 144 | 5.7 | NMP | 1/10 | 10 | 10 | NMP |
| Example 11 | 3 to 5 | 6 to 8 | 1/10 | 10 | 144 | 5.7 | NMP | 2/10 | 20 | 10 | NMP |
| Example 12 | 3 to 5 | 6 to 8 | 1/10 | 10 | 144 | 5.7 | NMP | 3/10 | 30 | 10 | NMP |
| Example 13 | 3 to 5 | 6 to 8 | 1/10 | 10 | 24 | 7.9 | NMP | 1/10 | 10 | 10 | NMP |
| Example 14 | 3 to 5 | 6 to 8 | 2/10 | 20 | 24 | 7.9 | NMP | 2/10 | 20 | 10 | NMP |
| Example 15 | 3 to 5 | 6 to 8 | 3/10 | 30 | 24 | 7.9 | NMP | 3/10 | 30 | 10 | NMP |
| Example 16 | 3 to 5 | 6 to 8 | 1/10 | 10 | 24 | 7.9 | IPA | 1/10 | 10 | 10 | IPA |
| Example 17 | 3 to 5 | 6 to 8 | 2/10 | 20 | 24 | 7.9 | IPA | 2/10 | 20 | 10 | IPA |
| Example 18 | 3 to 5 | 6 to 8 | 1/10 | 10 | 24 | 7.9 | BAC | 1/10 | 10 | 10 | BAC |
| Example 19 | 3 to 5 | 6 to 8 | 2/10 | 20 | 24 | 7.9 | BAC | 2/10 | 20 | 10 | BAC |
| Example 20 | 3 to 5 | 6 to 8 | 1/10 | 10 | 24 | 7.9 | Xyl | 1/10 | 10 | 10 | Xyl |
| Example 21 | 3 to 5 | 6 to 8 | 2/10 | 20 | 24 | 7.9 | Xyl | 2/10 | 20 | 10 | Xyl |

Evaluation 1: Property Evaluation of Graphene Dispersion

The graphene dispersions formed in example 1 to example 21 were measured for graphene average diameter, number of layers, and concentration difference (C %) between the top section and the bottom section of the storage container after being left to stand for 12 hours, and the evaluation results are provided in Table 2 below.

The measurement method of the concentration difference of the dispersion includes performing solid content analysis on the dispersion at ⅓ liquid height and ⅔ liquid height of the storage container every 24 hours, and subtracting the concentration $C_{1/3}$% at the ⅓ location from the concentration $C_{2/3}$% at the ⅔ location to obtain the C % concentration difference, wherein the solid content is the concentration obtained after drying the liquid. If the concentration difference is greater than 20% (i.e., ($C_{1/3}$%-$C_{2/3}$%)>20%), then dispersion is poor.

TABLE 2

| | Average diameter (μm) | Number of layers | Concentration difference (C %) |
|---|---|---|---|
| Example 1 | 7 to 10 | 8 to 10 | >50% |
| Example 2 | 3 to 5 | 8 to 10 | >50% |
| Example 3 | 1 to 3 | 6 to 8 | >30% |
| Example 4 | 0.6 to 0.8 | 6 to 8 | <15% |
| Example 5 | 1.0 to 1.2 | 6 to 8 | >20% |
| Example 6 | 0.8 to 1.0 | 6 to 8 | >20% |
| Example 7 | 0.6 to 0.8 | 4 to 6 | <15% |
| Example 8 | 0.6 to 0.8 | 3 to 5 | <15% |
| Example 9 | 0.6 to 0.8 | 3 to 5 | <15% |
| Example 10 | 0.6 to 0.8 | 3 to 5 | <15% |
| Example 11 | 0.6 to 0.8 | 3 to 5 | <15% |
| Example 12 | 0.8 to 1.0 | 3 to 5 | >20% |
| Example 13 | 0.6 to 0.8 | 3 to 5 | <5% |
| Example 14 | 0.6 to 0.8 | 3 to 5 | <10% |
| Example 15 | 0.6 to 0.8 | 4 to 6 | <15% |
| Example 16 | 0.6 to 0.8 | 3 to 5 | 8.89% |
| Example 17 | 0.6 to 0.8 | 3 to 5 | <5% |
| Example 18 | 0.6 to 0.8 | 3 to 5 | 18.91% |
| Example 19 | 0.6 to 0.8 | 3 to 5 | <10% |
| Example 20 | 0.6 to 0.8 | 3 to 5 | 3.42% |
| Example 21 | 0.6 to 0.8 | 3 to 5 | <10% |

It can be known from Table 2 that, the average diameter distribution of the graphenes of example 1 to example 21 formed using the preparation method of the invention is homogeneous, and therefore the issue of uneven product diameter distribution in a known physical method such as mechanical exfoliation, ultrasonic oscillation, or ball milling can be alleviated. Moreover, after being left to stand for 12 hours, the concentration distribution of the graphene dispersions of example 1 to example 21 increases from the top section to the bottom section of the storage container.

Evaluation 2: Property Comparison of Graphene Dispersion of Invention and Commercial Product The graphene dispersions formed in example 1 to example 21 and the commercial products of comparative example 1 to comparative example 6 were measured for the solid content of graphene and maximum suspension duration, and the evaluation results are provided in Table 3 below.

The solid content is the concentration obtained after the liquid is dried. The definition of 150 days of suspension duration is defined below: measurement is taken on the 150th day after the dispersion is formed, and if the concentration difference is <20%, then the suspension duration is at least 150 days. The measurement method of the concentration difference is described above and is therefore not repeated herein.

The commercial products of comparative example 1 to comparative example 6 were formed by a known oxidation process and stripping process without the homogenization process and layer-thinning process provided by the invention, wherein the raw material of comparative example 1 to comparative example 3 is graphite, and the raw material of comparative example 4 to comparative example 6 is graphene.

TABLE 3

| | Solid content (phr) | Maximum suspension duration (days) |
|---|---|---|
| Example 1 | 10 | 1 |
| Example 2 | 10 | 1 |
| Example 3 | 10 | 1 |
| Example 4 | 10 | 150 |
| Example 5 | 10 | 3 |
| Example 6 | 10 | 3 |
| Example 7 | 10 | 150 |
| Example 8 | 10 | 150 |
| Example 9 | 10 | 150 |
| Example 10 | 10 | 150 |
| Example 11 | 20 | 150 |
| Example 12 | 30 | 3 |
| Example 13 | 10 | 150 |
| Example 14 | 20 | 150 |
| Example 15 | 30 | 30 |
| Example 16 | 10 | 150 |
| Example 17 | 20 | 150 |
| Example 18 | 10 | 30 |
| Example 19 | 20 | 150 |
| Example 20 | 10 | 150 |
| Example 21 | 20 | 150 |
| Comparative example 1 | 0.1 to 1 | NA |
| Comparative example 2 | 0.05 | NA |
| Comparative example 3 | 0.02 to 0.2 | |
| Comparative example 4 | 0.2 to 5 | >90 |
| Comparative example 5 | 0.0001 to 1 | >7 |
| Comparative example 6 | 0.001 to 0.5 | |

It can be known from Table 3 that, compared to comparative example 1 to comparative example 6 using a known oxidation process and exfoliation process, example 1 to example 21 using the preparation method of the invention have significantly higher graphene solid content, and therefore the preparation method of the invention can solve the issue of low graphene solid content of commercial products to improve processability. As a result, application of the preparation method of the invention in the coating field can be facilitated. Moreover, as shown in Table 3, compared to the commercial products of comparative example 1 to comparative example 6, the preparation method of the graphene dispersion of the invention can effectively increase the suspension of graphene in a liquid, such that the stable dispersion duration can achieve 150 days.

Based on the above, in the invention, a low-oxygen contained graphene powder with a specific number of layers is mainly formed by an air flow generating device, and a graphene dispersion utilizing a graphene powder with a specific number of layers and high solid content, and therefore major issues for current commercial graphene dispersion products such as low solid content and limited solvent options can be solved effectively, such that processability and adaptability in different coating processes can be improved to facilitate application in the coating field. Moreover, the graphene dispersion preparation method of the invention does not require oxidation, surface modification, or addition of a large amount of dispersing agent (>5%), and therefore the well crystallinity of graphene structure can be remained without structural damage during the oxidation process and also interfacial constrain resulted by the excess dispersing agent, and leads to a good properties thereof. Moreover, issues of polluted water and toxic waste generated from the oxidation process in prior art can be further solved to achieve the environmental needs. As a result, the invention can effectively improve the most of the current technical issues for the current graphene dispersion process such as increasing the yield and purity, providing a uniform distribution, and enhancing the stabilization duration of the graphene dispersion.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An air flow generating device for preparing a graphene powder, comprising:
    an outer bushing having a chamber, an intake opening, and an outtake opening, wherein the intake opening is connected to the chamber from below and the outtake opening is connected to the chamber from above, and the chamber has a necked portion; and
    a rotating awl disposed in the chamber, wherein the rotating awl and the chamber are conformal, the rotating awl and an inner wall of the chamber have a slit spacing in between, the rotating awl comprises a rotating body and a plurality of screw threads, and the plurality of screw threads are distributed on an outer surface of the rotating body from a bottom of the rotating body toward a top of the rotating body in a spiral manner, the rotating body comprises the bottom, the top, and a center located between the bottom and the top, and a diameter of the rotating body is decreased from the bottom to the top, wherein angles of the plurality of screw threads at the top, the center, and the bottom are different,
    when the rotating awl rotates in the chamber, an upward cyclone having a horizontal component is produced via the plurality of screw threads and the slit spacing.

2. The air flow generating device of claim 1, wherein a top surface of the rotating awl and a top surface of the necked portion are level.

3. The air flow generating device of claim 1, wherein a diameter of a bottom surface of the bottom is greater than a diameter of a top surface of the bottom.

4. The air flow generating device of claim 3, wherein a diameter of a bottom surface of the center is greater than a diameter of a top surface of the center, and the diameter of the bottom surface of the center is equal to the diameter of the top surface of the bottom.

5. The air flow generating device of claim 4, wherein a diameter of a bottom surface of the top is greater than a diameter of a top surface of the top, and the diameter of the bottom surface of the top is equal to the diameter of the top surface of the center.

6. The air flow generating device of claim 1, wherein a cross section of the rotating awl is stellate.

7. The air flow generating device of claim 1, wherein a rotating speed of the rotating awl is between 3000 rpm and 7000 rpm.

8. The air flow generating device of claim 1, wherein a quantity of the plurality of screw threads is between 8 and 32.

9. The air flow generating device of claim 8, wherein the quantity of the plurality of screw threads is between 12 and 18.

10. The air flow generating device of claim 1, wherein the slit spacing is between 0.05 mm and 10 mm.

11. The air flow generating device of claim 10, wherein the slit spacing is between 0.1 mm and 1 mm.

12. The air flow generating device of claim 1, wherein the angle of the plurality of screw threads located at the top is 15 to 35 degrees, the angle of the plurality of screw threads located at the bottom is 70 to 90 degrees, and the angle of the plurality of screw threads located at the center is 35 to 70 degrees.

* * * * *